United States Patent [19]
Murphy et al.

[11] Patent Number: 5,690,139
[45] Date of Patent: Nov. 25, 1997

[54] VALVE CONSTRUCTION

[76] Inventors: Kevin P. Murphy, 4 Carlisle Dr., Oak Brook, Ill. 60521; Garland Y. Smith, 605 Lakeside Dr., Hinsdale, Ill. 60521-5168; Anthony S. Zummer, 135 S. LaSalle St., Chicago, Ill. 60603

[21] Appl. No.: 674,118

[22] Filed: Jul. 1, 1996

Related U.S. Application Data

[60] Provisional application No. 60/000,941 Jul. 7, 1995.

[51] Int. Cl.⁶ ............................ F16K 43/00; F16L 55/132
[52] U.S. Cl. .................... 137/317; 137/318; 138/89; 138/94; 138/97
[58] Field of Search ........................ 137/317, 318; 138/94, 97, 89

[56] References Cited

U.S. PATENT DOCUMENTS

| | | | |
|---|---|---|---|
| 2,155,491 | 4/1939 | Jacobs | 138/89 |
| 2,171,576 | 9/1939 | Larry et al. | 137/15 |
| 2,171,937 | 9/1939 | Larry et al. | 138/94 |
| 2,171,942 | 9/1939 | Mueller | 137/318 |
| 2,184,634 | 12/1939 | Crickmer et al. | 138/89 |
| 2,272,734 | 2/1942 | Witt | 138/94 |
| 2,482,687 | 9/1949 | Mueller et al. | 137/318 |
| 2,510,513 | 6/1950 | Mueller et al. | 137/15 |
| 2,756,486 | 7/1956 | Smith | 137/318 |
| 2,763,282 | 9/1956 | Reedy et al. | 137/318 |
| 2,780,244 | 2/1957 | Lee | 138/94 |
| 2,968,465 | 1/1961 | Flick et al. | 251/63.6 |
| 3,115,163 | 12/1963 | Van Epps et al. | 138/94 |
| 3,409,035 | 11/1968 | Miller | 138/94 |
| 3,685,544 | 8/1972 | Ball et al. | 138/89 |
| 3,872,880 | 3/1975 | Ver Nooy et al. | 137/317 |
| 4,355,656 | 10/1982 | Smith | 137/318 |
| 4,369,813 | 1/1983 | Thomas | 138/94 |
| 5,052,431 | 10/1991 | Jiles | 137/318 |
| 5,186,199 | 2/1993 | Murphy et al. | 138/94 |

OTHER PUBLICATIONS

Bulletin J-3 Line Stopping Unit No. 3, Mueller Co., May 1977, pp. J-3-2 and J-3-4.

*Primary Examiner*—George L. Walton
*Attorney, Agent, or Firm*—Anthony S. Zummer

[57] ABSTRACT

A conduit stopper used with a nozzle sealingly mounted on an elongated conduit for selectively interrupting the flow of a fluid through the conduit. The conduit has an aperture communicating with the nozzle for receiving a portion of the conduit stopper. A plug holder is connected to the linear actuator. A retainer cap is secured to the plug holder for movement therewith in the nozzle. A deformable sealing element has one end secured to the retainer cap and an opposite end is adapted to be forced into sealing engagement in the interior of the conduit to interrupt the flow of the fluid through the conduit.

20 Claims, 8 Drawing Sheets

VALVE CONSTRUCTION

CROSS REFERENCE TO RELATED APPLICATION

This application is a provisional application Ser. No. 60/000,941, filed Jul. 7, 1995, titled, "Valve Construction".

BACKGROUND OF THE INVENTION

The utilization of isolating or block valves to interrupt fluid flow through a system of pressurized, interconnected conduits is well known. In municipalities, these piping systems are frequently installed underground and supply potable water or natural gas to customers whose buildings are served by branch conduits that connect into the utility piping systems.

When the original piping systems are installed, block or isolating valves are provided in each system. In the event of an emergency, or a routine repair, two or more of these original block valves are closed. This often isolates much more than one city block from utility service (either water or gas) for the duration of the work on the piping system.

As the community grows, the shutdowns deprive greater numbers of customers from water or gas service. It is realized that the number of isolation valves originally installed in the system are too few in number to minimize the extent of service outage whenever repairs are required on the piping systems.

New block valves could be installed by closing the original system valves. This would cause the same extensive shutdown as before. Of course, once the new block valves are installed, future shutdowns would isolate smaller areas than before, with fewer customers being deprived of service.

As an alternate, certain valves, well known in prior art, may be installed into a pressurized conduit with neglible loss of fluid, and without depressurizing the conduit. These pressure-installed valves were variously identified as: "Add-on-Valve" "Conduit Stopper" "Pipe Line Plugger" "In-Line Fluid Flow Control Valve. . .", etc. These valves can be installed close to the location of the repair, thereby greatly reducing the extent of the outage of fluid service.

The sealing portions of these valves are inserted into the pressurized conduit through a nozzle that is part of a fitting that is attached, pressure-tight, to the exterior of the conduit. Once the nozzle is sealingly attached to the pipe, a circular access opening is cut into the top of the pipe without loss of fluid pressure in said pipe. The process of cutting this hole is well known in prior art and is variously termed "pressure tapping", "hot tapping", "wet tapping", etc.

Common to the installation of most pressure-installed valves is a temporary gate-type valve which is removably mounted to the top of the aforesaid nozzle. When this valve is closed, the workman can attach or remove the various apparatus used to cut the pipe, insert the valve device, and install the completion parts. Thus, these operations are performed without loss of fluid pressure in the conduit.

Another commonality among the pressure-installed valves is the use of one or more resilient parts in the construction of the valve plugging head. The plugging head is the movable part of the valve that is forced through the nozzle and the pipe access opening into the interior of the conduit. Additional force causes the resilient member(s) to deform into sealing contact with the interior wall of the conduit. The upstream fluid pressure is restrained, and the conduit is depressurized downstream of the valve.

At the completion of the repair work on the depressurized pipe, the valve plugging head is withdrawn upward from the conduit into the nozzle. Fluid now flows into the repaired section of pipe.

The plugging head is removed from the nozzle through the temporary valve. A closure device is then removably installed into the nozzle, allowing recovery of the temporary valve. At a later time, the process can be repeated by reinstalling the temporary valve, followed by reinsertion of the plugging head into the interior of the conduit.

As an alternate, the plugging head may be left in the nozzle. A permanent actuating device, such as a jack screw, is affixed to the top of the plugging head. The jack screw assembly contains a completion device to allow recovery of the temporary valve. This configuration allows reuse of the pressure-installed valve without the need for remounting the temporary valve and the assorted apparatus.

In the operation of a specific prior art pressure-installed valve, it has been found that under certain conditions, especially high fluid pressure, there may be excessive leakage past the valve plugging head.

SUMMARY OF THE INVENTION

In those pressure-installed valves which use a deformable sealing element, which is also called stopper, it has been found that under high pressure the deformable stopper has a tendency to suffer further deformation which causes fluid to leak past the stopper. The present invention provides a retainer cap which receives a portion of the deformable sealing element and retains the sealing element to resist unwanted deformation of the element during installation into the pipe. The utilization of the retainer cap in cooperation with the sealing element reduces the force normal to the bore of the valve nozzle, and thereby transmits a greater force to that portion of the sealing element which deforms to engage the interior of the pipe in sealing contact.

BRIEF DESCRIPTION OF THE DRAWINGS

Referring now to the drawings, and especially to FIGS. 2 and 3, which show the conventional prior art construction wherein a conventional pressurized pipe or conduit 20 has a circular aperture 22 cut therein. A lower half of a saddle 24 is connected in a pressure-tight manner to the pipe and welded to an upper half of a saddle 26 which has a cylindrical nozzle 28 with a diameter essentially the same as that of the pipe 20. A fully ported conventional slide gate valve 30 is connected to the nozzle by gasketed flanges. As an alternate construction, connection may be made with pipe threads. A stopper housing 32 is connected pressure tight to the slide valve 30. A conventional hydraulic cylinder 34 is mounted onto the housing 32. Cylinder 34 includes a piston 36 connected to a cylinder rod 38 which extends through the housing and the valve into nozzle 28. Although a hydraulic cylinder is the preferred embodiment, other linear actuators, such as a jack screw assembly, can be used. The prior art plug holder 40 is connected to the rod 38. The plug holder includes a collar 42 which is secured to rod 38 by a pair of conventional bolts and nuts 44. Referring to FIG. 3, holder plate 46 is formed integral with the collar and a holder bar or rod 48 is formed integral with plate 46. A heavy washer 50 is held onto the end of holder bar 48 by a bolt 52. The prior art sealing element 54 made of a rubber like deformable material is mounted onto bar 48.

Figure 3:
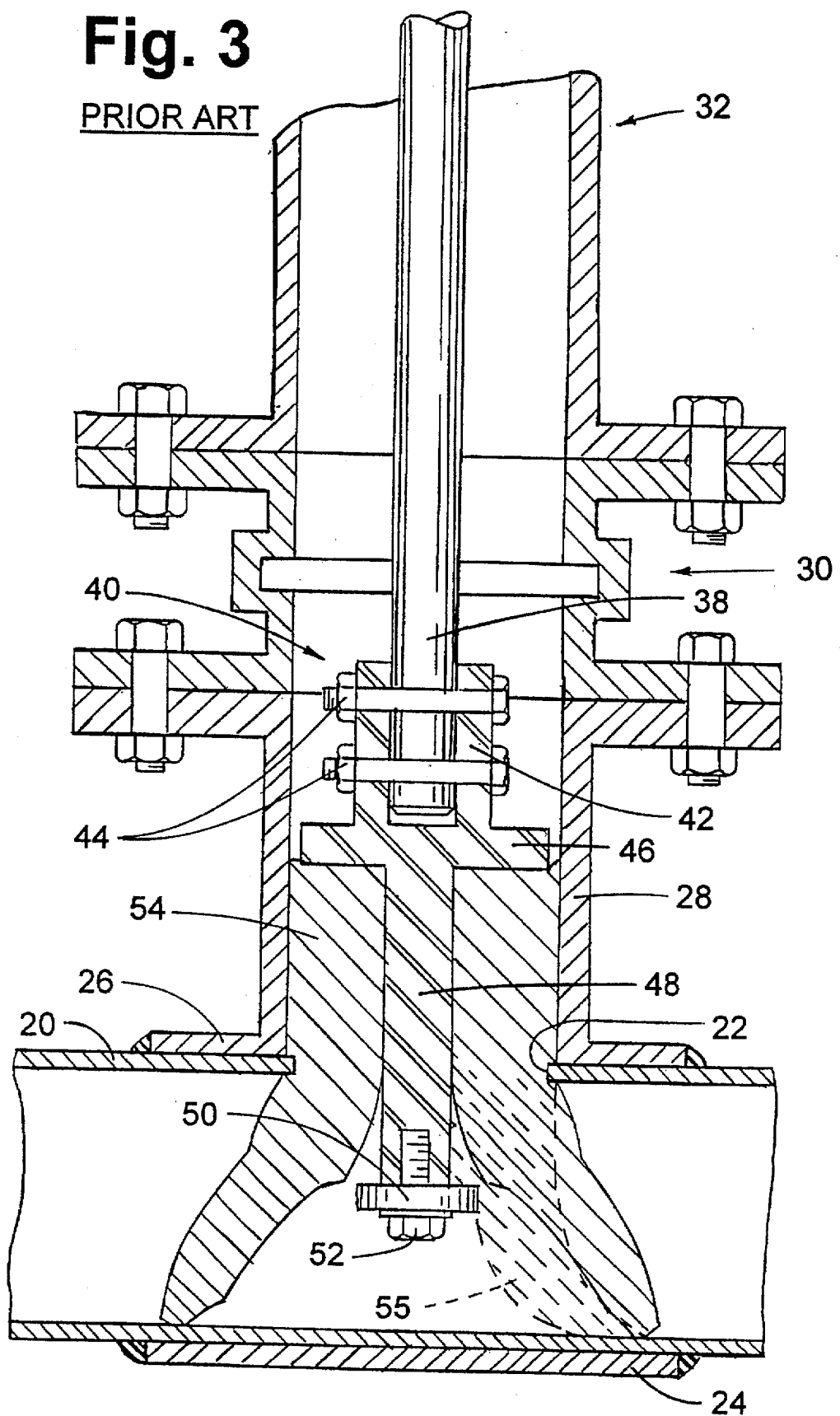
FIG. 3 is a cross sectional view taken along line 3—3 of FIG. 2 showing the position of the prior art plugging head when the stopper is sealingly deformed in a pressurized pipe.

The top of element 54 is held against the bottom of plate 46 by the heavy washer 50. The hydraulic cylinder forces the plugging head, which consists of the holder 40 and the element 54, downward in the nozzle 28. The lower portion of the element passes through the aperture 22 into the interior of the pipe 20. Further downward force from the cylinder rod 38 causes the sealing element to deform into sealing contact with the interior of the pipe 20 as shown in FIG. 3.

When the fluid pressure is increased, the upstream portion of the element 54 can collapse into the position shown by the dashed hatching 55. The force from the fluid pressure is transmitted through the collapsed element 55 to the holder bar or rod 48 and washer 50. This force imposes a bending moment that is transmitted through the plug holder collar 42 to the cylinder rod 38.

Figure 4:
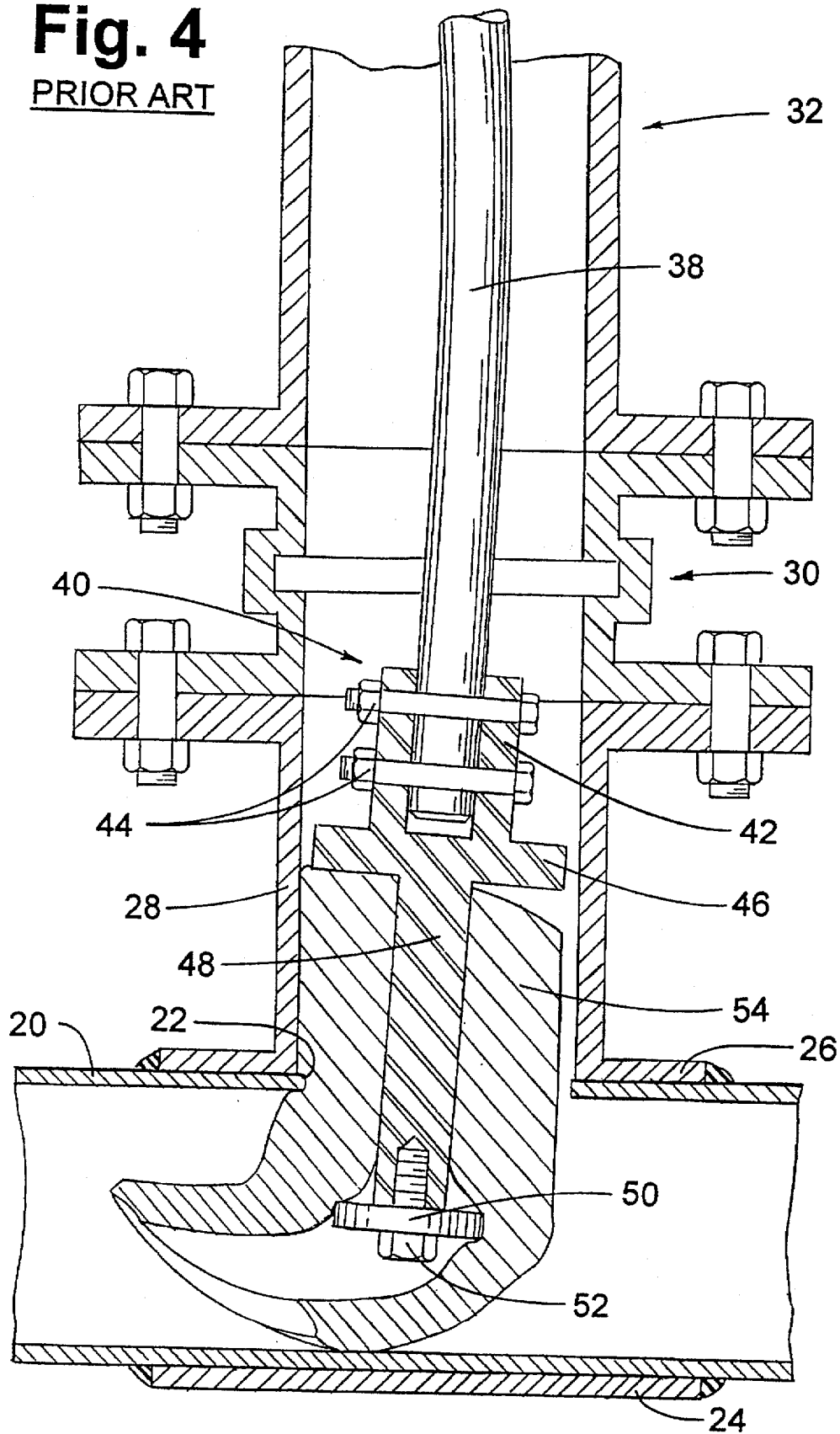
FIG. 4 is similar to FIG. 3, but showing the failure of the prior art element as a result of an increase of fluid pressure in the pipe.

As shown in FIG. 4, further increases in fluid pressure can force the sealing element 54 away from the interior wall of the pipe 20 resulting in the element folding under and offering no resistance to fluid flow in the pipe. It should be noted how the upper portion of the sealing element is pulled away from plate 46 and there is a bend in rod 38.

Figure 1:
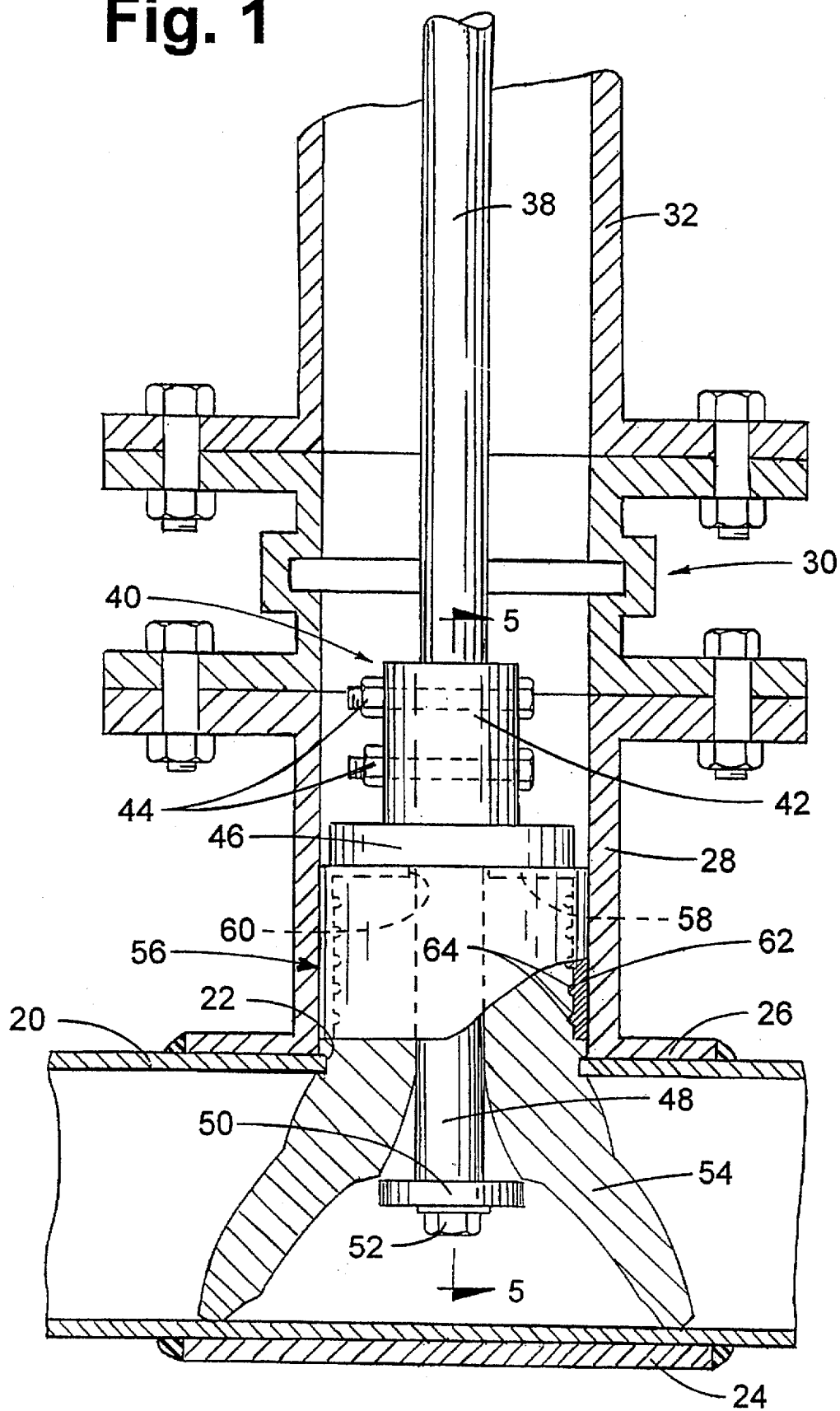
FIG. 1 is a cross sectional view showing a portion of a pipe with a sealing element in the deformed configuration in the pipe with a retainer cap which is positioned in a valve nozzle.
Figure 2:
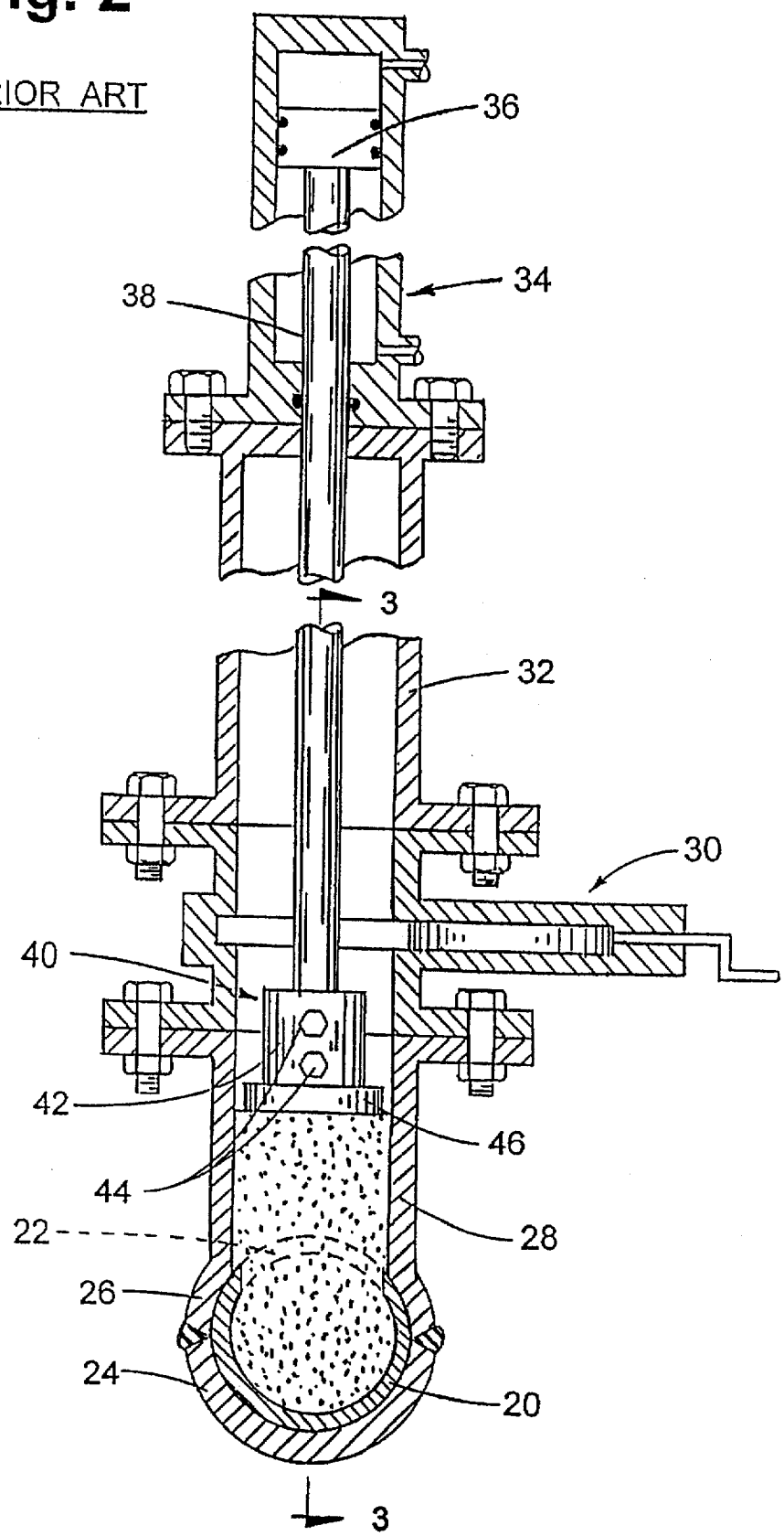
FIG. 2 is a fragmentary cross sectional view showing a prior art construction having a resilient sealing element.

Referring now to FIG. 1 where like parts are identified by the numerals mentioned above, it may be seen that the improved valve construction includes a retainer cap 56 which receives the upper end of sealing element 54. The retainer cap includes annular base portion 58 with an aperture 60 which receives rod 48. A cylindrical sidewall 62 has its upper end formed integral with the annular base 58. The sidewall has a longitudinal axis perpendicular to the annular base. The cylindrical sidewall defines a hollow interior which is a hollow receptacle portion. The cylindrical sidewall has a plurality of identical ridges 64 formed on the interior surface extending into the receptacle portion. The upper end of sealing element 54 is molded into the receptacle portion of cap 56 and the ridges retain the upper end of the sealing element within the retainer cap. Washer 50 holds the sealing element in position.

Figure 5:
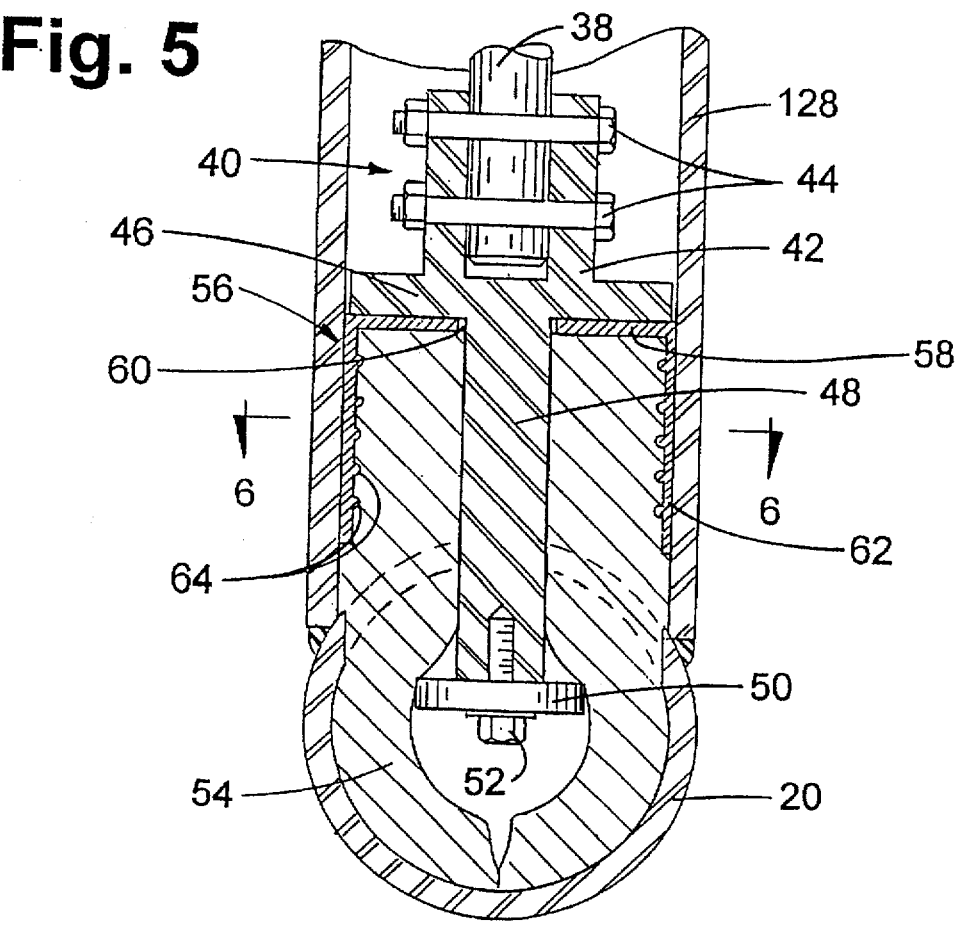
FIG. 5 is a cross sectional view taken along line 5—5 of FIG. 1, showing a valve nozzle welded to the pipe and showing a sealing element with a retainer cap.

In the operation of the instant valve, the hydraulic cylinder (or other linear actuator) pushes the sealing element through the aperture 22 until the bottom of the sealing element engages the sidewall of pipe 20. Further application of force causes downward movement of the retainer cap 56 and causes the sealing element 54 to move downward along the pipe sidewall until opposite sides of the sealing element meet each other as shown in FIG. 5. The portions of the sealing element normal to the portions of the sealing element engaging the sidewall are pushed outward in upstream and downstream directions to the attitude shown in FIG. 1. It is important to note that by utilization of the retainer cap, the sealing element 54 has a reduced portion in engagement with the interior of nozzle 28. The portion of the sealing element in the nozzle is compressed by the actuate force from the hydraulic cylinder producing a pressure normal to the bore of the nozzle. Much additional actuate force is needed to overcome the friction between the element and nozzle wall, above that required to accomplish the primary function of deforming the element 54 in the pipe. The sealing element is positioned in aperture 22 to have a sealing engagement with the pipe at the aperture.

Figure 6:
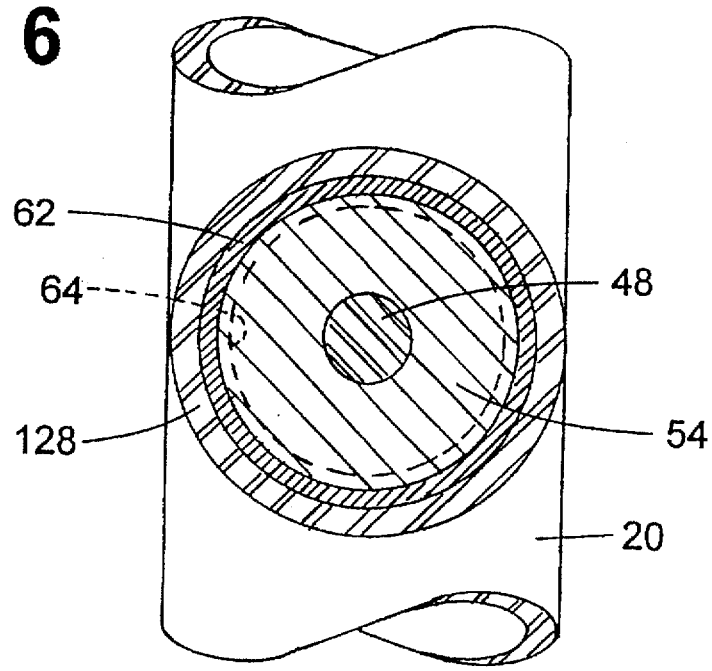
FIG. 6 is a cross sectional view taken on line 6—6 of FIG. 5.

Referring now to FIGS. 5 and 6, a modified form of nozzle 128 is shown therein in FIG. 5. A nozzle 128 is shown welded directly to pipe 20 thereby eliminating the upper and lower halves of the saddle. It is noted that welding is the preferred construction to attach the valve enclosure to the pipe in a pressure-tight manner. When welding is not possible, pressure tight attachment can be made using resilient gaskets and saddle halves that are joined by bolting. The operation of the sealing element remains the same. FIG. 5 shows how the sealing element engages opposed ends of the portion of the sealing element which moved downward along the interior sidewall of the pipe. FIG. 6 is a cross sectional view taken along line 6—6 of FIG. 5.

Figure 7:
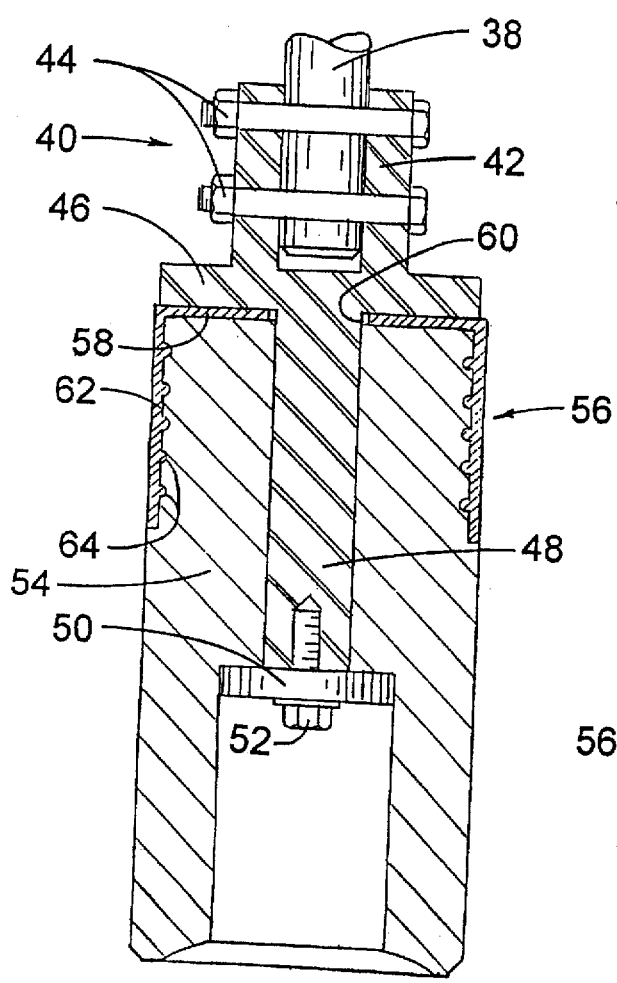
FIG. 7 is an enlarged cross sectional view showing a sealing element with a holder plate, holder bar and retainer cap.
Figure 8:
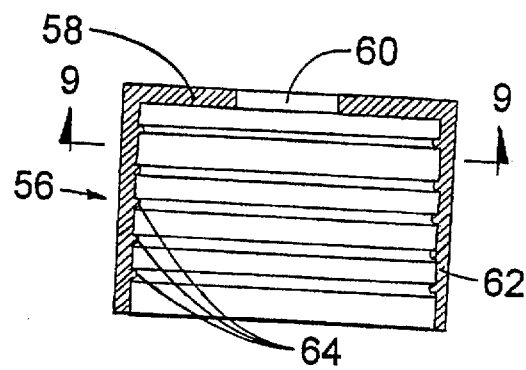
FIG. 8 is a cross sectional view of the retainer cap shown in FIG. 7.
Figure 9:
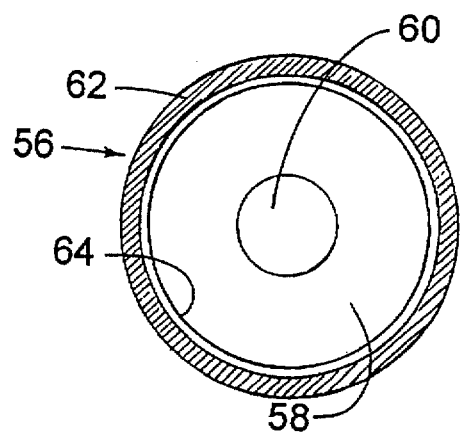
FIG. 9 is a cross sectional view taken on line 9—9 of FIG. 8.

FIG. 7 shows the sealing element molded into the retainer cap and mounted on a plug holder. The interior construction of the retainer cap 56 is shown in FIGS. 8 and 9.

Figure 10:
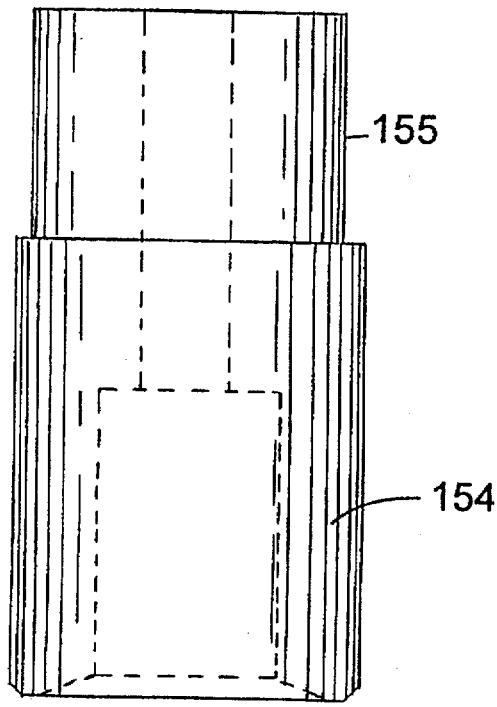
FIG. 10 is a side elevation of a modification of the sealing element of FIG. 7.

FIG. 10 shows a side elevational view of a modified sealing element 154 having a reduced upper portion 155. The interior element construction is the same as that shown in FIG. 7. The reduced upper portion is mechanically attached to the interior of the retainer cap while the lower body of the sealing element has a relaxed outside diameter substantially identical to the outside diameter of the retainer cap.

Figure 11:
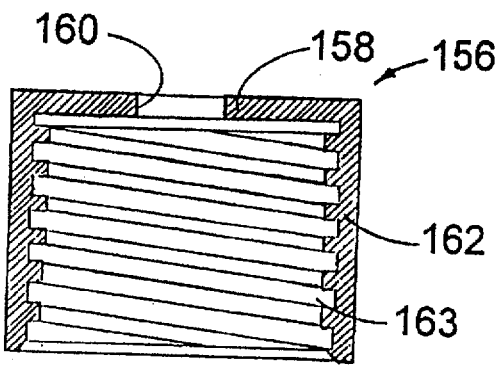
FIG. 11 is a cross sectional view of a retainer cap wherein the cap has an internally threaded portion for engagement with the sealing element shown in FIG. 10.

In FIG. 11, a modified retainer cap 156 is shown. The retainer cap 156 includes an annular plate 158 with an aperture 160 and a cylindrical sidewall 162 formed integral with the annular base to define a receptacle portion. The cylindrical sidewall 162 includes an internal helical thread 163 for mechanically receiving the resilient sealing element. The diameter of the upper portion 155 of element 154 is sized to allow mechanical attachment of said upper portion into the modified retainer cap 156 shown in FIG. 11. An adhesive may be used to secure further the sealing element in the retainer cap.

Figure 12:
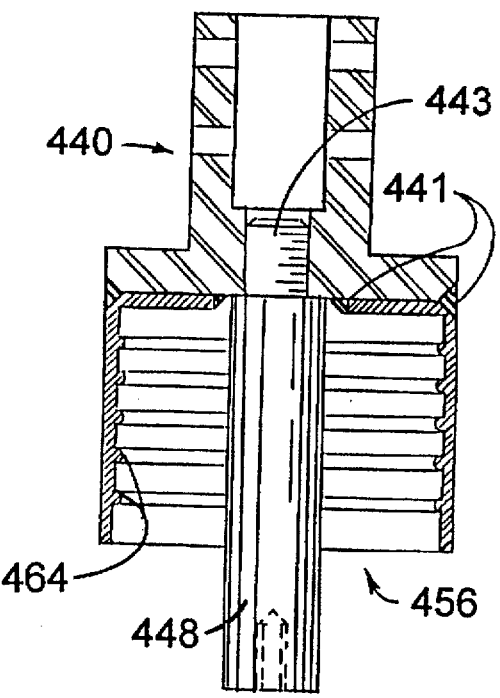
FIG. 12 is a cross sectional view showing a modified form of the carrier having a holder bar threadedly mounted to a receptacle in the holder plate.

A further modified form of the retainer cap is shown in FIG. 12. In FIG. 12, a retainer cap 456 is secured to plug holder 440 by welds 441. Other methods of securing the retainer cap to the holder, such as threaded or riveted fasteners, or casting the two parts as a single unit, can be used but are not illustrated. This embodiment greatly increases the rigidity of the plugging head assembly. Although FIG. 12 shows internal ridges 464 in the cap 456, other means to secure the sealing element to the interior of the retainer cap can be used.

Figure 13:
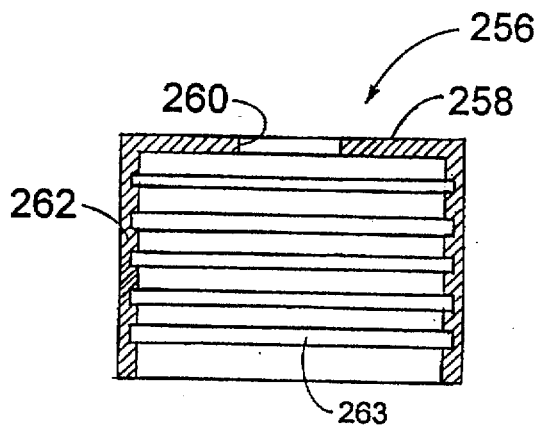
FIG. 13 is a cross sectional view of a modified form of the retainer cap which has internal grooves for retaining the sealing element.

FIG. 13 shows a further modified form of the retainer cap; namely, a retainer cap 256 which has an annular base 258 with an aperture 160 and a cylindrical sidewall 262 formed with the base. The cylindrical sidewall has a plurality of internal grooves 263 formed therein for receiving the sealing element during the element forming process.

Figure 14:
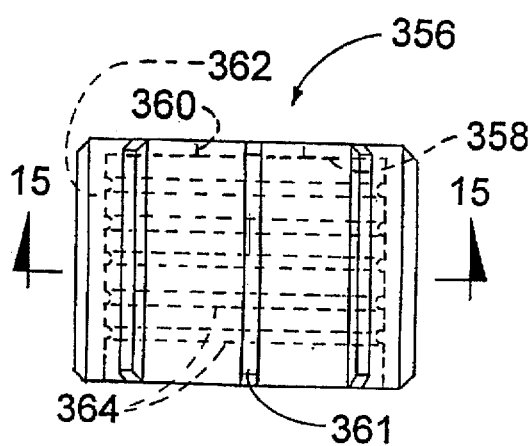
FIG. 14 is a side elevation of a modified form of a retainer cap having external ridges for sliding engagement with the interior of a valve nozzle.
Figure 15:
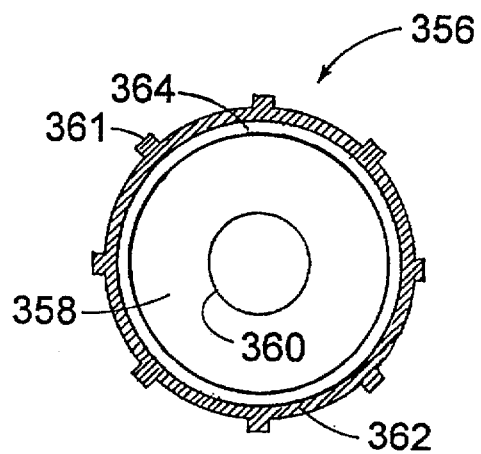
FIG. 15 is a cross sectional view taken on line 15—15 of FIG. 14.

FIGS. 14 and 15 show a further modified form of retainer cap 356. Retainer cap 356 has an annular base 358 with an aperture 360 and a cylindrical sidewall 362 formed integral with the annular base. The cylindrical sidewall 312 has a longitudinal axis which is parallel to the vertical axis of the retainer cap. The sidewall 358 has a plurality of external ribs 361, which are formed parallel with the vertical axis of the retainer cap 356 and a plurality of internal ridges 364 formed therein. The ribs 361 provide a means for reducing the friction between the retainer cap 356 and the nozzle.

Although the present invention has been shown and described in detail in specific embodiments in compliance with the applicable statute, it is readily apparent that those skilled in the art may make various modifications and changes in the disclosed structure without departing from the spirit and scope of the present invention. It is to be expressly understood that the instant invention is limited only by the appended claims.

What is claimed is:

1. In a conduit stopper for use with a nozzle, said nozzle sealingly mounted on an elongated conduit, said conduit stopper selectively interrupting the flow of a fluid through the interior of the conduit, said conduit having an aperture communicating with the nozzle for receiving the conduit stopper, said conduit stopper having a linear actuator connected thereto, said conduit stopper including a plug holder connected to the linear actuator for movement of the plug holder within the nozzle, the improvement comprising a retainer cap connected to the plug holder moveable longitudinally within the nozzle, said retainer cap having a cylindrical sidewall within said nozzle and extending along a length therein toward said apertures, an elongated deformable sealing element having one end secured in the retainer cap and an opposite end positioned in the interior of the conduit for sealing engagement therewith to interrupt the flow of fluid through the conduit, said cylindrical sidewall having internally thereof means to secure the one end of the sealing element to the interior of the retainer cap, whereby deformation of said opposite end of the sealing element by fluid pressure in the conduit does not affect the retention of the one end of the sealing element in the cylindrical sidewall and in the nozzle to maintain a seal in the conduit and at the aperture to prevent leakage in the nozzle.

2. In a conduit stopper for use with a nozzle, said nozzle sealingly mounted on an elongated conduit as defined in claim 1, wherein said opposite end of said elongated sealing element extends into the nozzle and through the aperture for selective sealing engagement therewith.

3. In a conduit stopper for use with a nozzle, said nozzle sealingly mounted on an elongated conduit as defined in claim 1, wherein said retainer cap has an annular base connected to the plug holder, the cylindrical sidewall defining a hollow interior connected to the annular base receiving the one end of the sealing element, and said means to secure the one end of the sealing element including a plurality of ridges formed within the cylindrical sidewall engaging the sealing element to secure the sealing element to the retainer cap.

4. In a conduit stopper for use with a nozzle, said nozzle sealingly mounted on an elongated conduit as defined in claim 1, wherein said retainer cap has an annular base connected to the plug holder, the cylindrical sidewall formed integral with the annular base defining a hollow receptacle portion, and said means to secure the one end of the sealing element including an internal thread receiving the one end of the deformable sealing element.

5. In a conduit stopper for use with a nozzle, said nozzle sealingly mounted on an elongated conduit as defined in claim 1, said retainer cap has an annular base connected to the plug holder, the cylindrical sidewall connected to the annular base defining a hollow receptacle portion receiving the one end of the sealing element, and a plurality of external ribs formed integral with the sidewall adapted for sliding engagement with the nozzle.

6. In a conduit stopper for use with a nozzle, said nozzle sealingly mounted on an elongated conduit as defined in claim 1, wherein said retainer cap has an annular base welded to the plug holder, and the cylindrical sidewall connected to the outer periphery of the annular base, said sidewall defining a hollow receptacle portion receiving the one end of the sealing element.

7. In a conduit stopper for use with a nozzle, said nozzle sealingly mounted on an elongated conduit as defined in claim 1, wherein said retainer cap has an annular base connected to the plug holder, the cylindrical sidewall connected to the annular base defining a hollow receptacle portion, and said means to secure the one end sealing element including a plurality of grooves communicating with the hollow receptacle portion, the one end of the sealing element positioned in the receptacle portion and into the grooves.

8. In a conduit stopper for use with a nozzle, said nozzle sealingly mounted on an elongated conduit as defined in claim 1, wherein said retainer cap has an annular base welded to the plug holder, and the cylindrical sidewall connected to the outer periphery of the annular base, said sidewall defining a hollow receptacle portion receiving the one end of the sealing element, said means to secure the one end of the sealing element including a plurality of annular ridges formed in the cylindrical sidewall engaging the sealing element to secure the sealing element to the retainer cap.

9. In a conduit stopper for use with a nozzle, said nozzle sealingly mounted on an elongated conduit as defined in claim 1, wherein said retainer cap has an annular base welded to the plug holder, and the cylindrical sidewall connected to the outer periphery of the annular base, said sidewall defining a hollow receptacle portion receiving the one end of the sealing element, said means to secure the one end of the sealing element including an internal thread formed in the cylindrical sidewall engaging the sealing element to hold the sealing element in the retainer cap.

10. In a conduit stopper for use with a nozzle, said nozzle sealingly mounted on an elongated conduit as defined in claim 1, wherein said retainer cap has an annular base connected to the plug holder, the cylindrical sidewall formed integral with the annular base defining a hollow receptacle portion receiving the one end of the sealing element, said means to secure the one end of the sealing element including a plurality of annular ridges formed within the cylindrical sidewall engaging the seating element to secure the sealing element to the retainer cap, and a plurality of external ribs formed integral with the sidewall adapted for sliding engagement with the nozzle.

11. In a conduit stopper for use with a nozzle, said nozzle sealingly mounted on an elongated conduit as defined in claim 1, wherein said retainer cap has an annular base connected to the plug holder, the cylindrical sidewall formed integral with the annular base defining a hollow receptacle portion receiving the one end of the sealing element, said means to secure the one and of the sealing element including an internal thread receiving the sealing element to hold the sealing element in the retainer cap, and a plurality of external ribs formed integral with the sidewall adapted for sliding engagement with the nozzle.

12. In a conduit stopper for use with a nozzle, said nozzle sealingly mounted on an elongated conduit as defined in claim 1, wherein said retainer cap has an annular base welded to the plug holder, and the cylindrical sidewall connected to the outer periphery of the annular base, said sidewall defining a hollow receptacle portion receiving one end of the sealing element, the opposite end of said elongated sealing element extending into the nozzle and through the aperture for selective sealing engagement therewith.

13. In a conduit stopper for use with a nozzle, said nozzle sealingly mounted on an elongated conduit as defined in claim 1, wherein said retainer cap has an annular base connected to the plug holder and the cylindrical sidewall defining a hollow receptacle portion formed integral with the annular base receiving the one end of the sealing element, said means to secure the one end of the sealing element including an internal thread engaging the sealing element to secure the sealing element to the retainer cap, said opposite end of said elongated sealing element extending into the nozzle and through the aperture for selective sealing engagement therewith.

14. In a conduit stopper for use with a nozzle, said nozzle sealingly mounted on an elongated conduit as defined in claim 1, wherein said retainer cap has an annular base connected to the plug holder and the cylindrical sidewall defining a hollow receptacle portion formed internal with the annular base receiving the one end of the sealing element, said means to secure the one end of the sealing element including a plurality of annular ridges formed within the cylindrical sidewall engaging the sealing element to secure the seating element to the retainer cap said opposite end of said elongated sealing element extending into the nozzle and through the aperture for selective sealing engagement therewith.

15. In a conduit stopper for use with a nozzle, said nozzle sealingly mounted on an elongated conduit as defined in claim 1, wherein said retainer cap includes an annular base welded to the plug holder, the cylindrical sidewall formed integral with the outer periphery of the annular base, said sidewall defining a hollow receptacle portion receiving the one end of the sealing element, said means to secure the one end of the sealing element including a plurality of annular ridges formed integral with the interior of the cylindrical sidewall engaging the sealing element to secure the sealing element to the retainer cap, said opposite end of said elongated sealing element extending into the nozzle and through the aperture for selective sealing engagement therewith, and a rod fixed to the plug holder, the rod being surrounded by the sealing element and being positioned in the receptacle portion and the aperture and extending into the conduit.

16. In a conduit stopper for use with a nozzle, said nozzle sealingly mounted on an elongated conduit as defined in claim 1, wherein said retainer cap includes an annular base welded to the plug holder, the cylindrical sidewall formed integral with the outer periphery of the annular base, said sidewall defining a hollow receptacle portion receiving the one end of the sealing element said means to secure the one end of the sealing element including an internal thread engaging the sealing element to secure the sealing element to the retainer cap, said opposite end of said elongated sealing element extending into the nozzle and through the aperture for selective sealing engagement therewith, and a rod fixed to the plug holder, the rod being surrounded by the sealing element and being positioned in the receptacle portion and the aperture and extending into the conduit.

17. In a conduit stopper for use with a nozzle, said nozzle sealingly mounted on an elongated conduit as defined in claim 1, wherein said retainer cap includes an annular base welded to the plug holder, the cylindrical sidewall formed integral with the outer periphery of the annular base, said sidewall defining a hollow receptacle portion receiving the one end of the sealing element, said means to secure the one end of the sealing element including an internal thread extending into the hollow receptacle portion engaging the sealing element to hold the sealing element in the retainer cap, a rod connected to the plug holder positioned in the receptacle portion within the sealing element, and a plurality of external ribs formed integral with the exterior of the sidewall adapted for sliding engagement with the nozzle.

18. In a conduit stopper for use with a nozzle, said nozzle sealingly mounted on an elongated conduit as defined in claim 1, wherein said retainer cap includes an annular base welded to the plug holder, the cylindrical sidewall formed integral with the outer periphery of the annular base, said sidewall defining a hollow receptacle portion receiving the one end of the sealing element, said means to secure the one end of the sealing element including a plurality of annular ridges formed within the cylindrical sidewall and extending into the hollow receptacle portion engaging the sealing element to secure the sealing element to the retainer cap, a rod connected to the plug holder positioned in the receptacle portion within the sealing element, and a plurality of external ribs formed integral with the exterior of the sidewall adapted for sliding engagement with the nozzle.

19. In a conduit stopper for use with a nozzle, said nozzle sealingly mounted on an elongated conduit as defined in claim 1, wherein said retainer cap includes an annular base connected to the plug holder, the cylindrical sidewall formed integral with the outer periphery of the annular base, said sidewall defining a hollow receptacle portion, said means to secure the one end of the sealing element including an internal thread communicating with the hollow receptacle portion, the one end of the sealing element positioned in the receptacle portion and engaging the internal thread, and a plurality of external ribs formed integral with the exterior of the sidewall adapted for sliding engagement with the nozzle.

20. In a conduit stopper for use with a nozzle, said nozzle sealingly mounted on an elongated conduit as defined in claim 1, wherein said retainer cap includes an annular base connected to the plug holder, the cylindrical sidewall formed integral with the outer periphery of the annular base, said sidewall defining a hollow receptacle portion, said means to secure the one end of the sealing element including plurality of annular grooves communicating with the hollow receptacle portion, the one end of the sealing element positioned in the receptacle portion and into the grooves, and a plurality of external ribs formed integral with the exterior of the sidewall adapted for sliding engagement with the nozzle.

* * * * *

UNITED STATES PATENT AND TRADEMARK OFFICE
CERTIFICATE OF CORRECTION

PATENT NO. : 5,690,139
DATED : November 25, 1997
INVENTOR(S) : Kevin P. Murphy, et al.

It is certified that error appears in the above-identified patent and that said Letters Patent is hereby corrected as shown below:

Column 5, Line 46, cancel "apertures" and insert --aperture--.

Column 7, Line 1, cancel "seating" and insert --sealing--.

Column 7, Line 45, cancel "seating" and insert --sealing--.

Column 7, Line 45, after "cap" insert --,--.

Column 8, Line 5, after "element" insert --,--.

Column 8, Line 34, cancel "scaling" and insert --sealing--.

Column 8, Line 37, cancel "scaling" and insert --sealing--.

Column 8, Line 60, after "including" insert --a--.

Signed and Sealed this

Third Day of March, 1998

Attest:

BRUCE LEHMAN

*Attesting Officer*  *Commissioner of Patents and Trademarks*